United States Patent [19]

Dittner et al.

[11] Patent Number: 4,691,813

[45] Date of Patent: Sep. 8, 1987

[54] FRICTION CLUTCH OPERATED PRESSURE MODULATOR

[75] Inventors: Adam Dittner, Höchstadt; Werner Hutterer, Fürth; Joachim Sauer, Erlagen, all of Fed. Rep. of Germany

[73] Assignee: FAG Kugelfischer Georg Schafer KGaA, Fed. Rep. of Germany

[21] Appl. No.: 899,212

[22] Filed: Aug. 21, 1986

[30] Foreign Application Priority Data

Aug. 24, 1985 [DE] Fed. Rep. of Germany ....... 3530286

[51] Int. Cl.⁴ .............................................. B60T 8/42
[52] U.S. Cl. ................................... 192/13 R; 303/115
[58] Field of Search ..................... 192/13 R, 12 D; 303/100, 115; 91/459; 251/294; 137/495

[56] References Cited

U.S. PATENT DOCUMENTS

| 3,480,336 | 11/1969 | Clark et al. | 303/115 |
| 3,726,568 | 4/1973 | Krugler, Jr. | 303/115 |
| 3,756,664 | 9/1973 | Schlitz et al. | 303/115 |
| 4,017,126 | 4/1977 | Ohta | 303/115 |
| 4,066,301 | 1/1978 | Harries | 303/115 |
| 4,095,851 | 6/1978 | Ando et al. | 303/115 |
| 4,511,971 | 4/1985 | Dittner et al. | 364/426 |

FOREIGN PATENT DOCUMENTS 2427238 1/1975 Fed. Rep. of Germany .
2648042 9/1978 Fed. Rep. of Germany .

Primary Examiner—Leslie Braun
Assistant Examiner—Richard M. Lorence
Attorney, Agent, or Firm—Ostrolenk, Faber, Gerb & Soffen

[57] ABSTRACT

A pressure modulator for anti-locking brake systems is provided with a pressure relief piston whose movement is controlled as a function of torque transmitted by an electromagnetic friction clutch.

7 Claims, 2 Drawing Figures

FRICTION CLUTCH OPERATED PRESSURE MODULATOR

BACKGROUND OF THE INVENTION

The present invention relates to a friction clutch operated pressure modulator for anti-locking brake systems for wheel driven vehicles.

For automobiles, motorcycles, and the like, that are provided with an anti-locking brake system, during braking when a given deceleration threshold, for instance 12 m/s², is exceeded, an anti-locking device generates an electric signal to reduce the braking pressure until a lower second deceleration threshold, for instance 10 m/s², is reached. Now, the anti-locking device generates an electric signal to increase the braking pressure again and deceleration increases up to the first deceleration threshold. This build up and decrease of the brake pressure is effected by means of a pressure modulator.

Such pressure modulators are ordinarily controlled hydraulically by means of separate pumps. Such a construction has the disadvantage that the response time of the pressure modulator is strongly dependent on the viscosity of the hydraulic fluid and on the pressure differential present on it. In addition, it is costly to manufacture and precise regulation is very difficult if not impossible. Furthermore, there is the danger that under unfavorable circumstances failure of the hydraulic pump will result in it no longer being possible for the vehicle to be braked sufficiently, if at all.

Federal Republic of Germany Pat. No. 26 48 042 discloses a magnet-actuated modulator device used to brake a spinning wheel by acting in a manner similar to that of a locking differential. By periodic excitation of the magnet coil, the armature thereof is used to pump hydraulic fluid from a pump chamber into the wheel cylinder of the spinning wheel, thus braking the latter. Such a modulator is not suitable for regulating the braking pressure in an anti-locking device since neither the relief nor the buildup of braking pressure takes place in defined fashion.

For the most part when the prior art has attempted to use electromagnetically operated modulators, the constructions have been unduly large and/or heavy in order to achieve a somewhat linear force/air gap characteristic required to obtain well defined braking characteristics.

SUMMARY OF THE INVENTION

The object of the instant invention is to provide an electromagnetically actuatable pressure modulator of compact lightweight construction which controls braking pressure in the wheel cylinder in a well-defined and reproducible manner when the pressure acting on it from the master cylinder is greater than the pressure which is necessary for locking of the wheel.

This object is achieved by utilizing a modulator having a pressure relief piston that is operatively connected by means of a chain with the output side of an electromagnetic friction clutch whose input side is rotating. By means of this connection, the piston stroke is controlled as a function of torque transmitted by the clutch. The pressure relief piston is operatively connected with a valve so that when a predetermined maximum braking pressure is exceeded the wheel cylinder is disconnected from the master cylinder thereby limiting pressure applied to the wheel cylinder.

BRIEF DESCRIPTION OF THE DRAWINGS

This invention will now be described in detail with reference to the accompanying drawings, in which.

DESCRIPTION OF THE PREFERRED EMBODIMENTS

Figure 1:
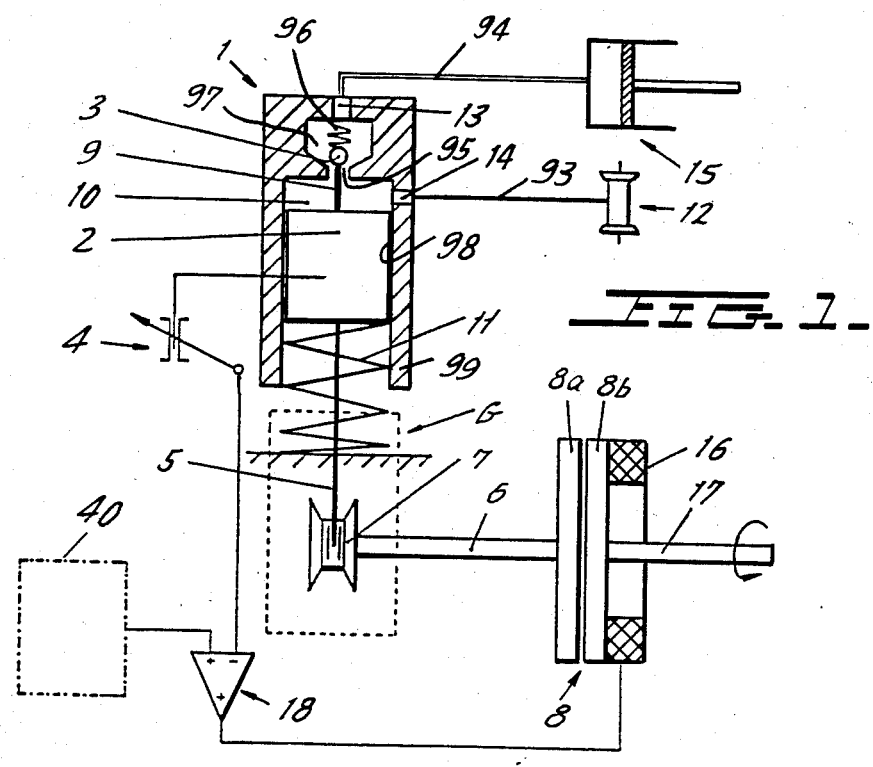
FIG. 1 is a longitudinal section through an electromagnetic friction clutch actuatable pressure modulator constructed in accordance with teachings of the instant invention.

FIG. 1 illustrates modulator 1 which includes body 99 having bore 98 wherein pressure relief piston 2 is slidably mounted. That portion of bore 98 above piston 2 defines variable volume chamber 10. Above bore 98, body 99 is also provided with cavity 97 wherein ball valve 3 and compression spring 96 are disposed. Inlet 95 connects cavity 97 to the upper end of bore 98 and spring 96 biases valve 3 toward its closed position wherein inlet 95 is closed. Hydraulic line 94 connects master cylinder 15 to input part 13 of cavity 97 and hydraulic line 93 connects output port 14 of chamber 10 to wheel cylinder 12, the latter being engageable with a rotating wheel (not shown) for stopping rotation thereof.

Coiled compression spring 11 biases piston 2 upward toward its upper dead center or basic position shown in FIG. 1 wherein tappet projection 9 at the upper end of piston 2 extends through inlet 95 and lifts valve 3 to its open position. The lower end of piston 2 is connected by a line, such as chain 5, to pulley 7 that is keyed to shaft 6 extending from output disk 8a of electromagnetically operated friction clutch 8. The latter also includes operating coil 16 and input disk 8b having driven shaft 17 extending therefrom.

Magnet coil 16 is connected to the output of comparator 18 which has one input connected to the output of set point value guide or generator 40, and has another input that is connected to the output of position monitoring device 4 whose input is driven by piston 2. When piston 2 is displaced in the direction towards its lower dead center, tappet 9 disengages valve 3 which closes inlet 13 so that master cylinder 15 is disconnected from wheel cylinder 12. This means that even upon panic braking (a braking pressure of 150 bars can easily be built up in master cylinder 15) the braking pressure which is active on wheel cylinder 12 is not above the predetermined set value (60 bar).

Pressure modulator 1 operates under the basic concept of decreasing excessive brake pressure on wheel cylinder 12 by increasing the volume of chamber 10. Anti-locking electronics (not shown) recognizes the threat of overbraking of the vehicle and actuates coil 6 of friction clutch 8 so that friction clutch disks 8a, 8b engage and rotation of input shaft 17 is transmitted to output shaft 6. The torque transmitted from disk 8b to disk 8a depends upon the energization level of coil 16. When torque is transmitted to output shaft 6, guide roller 7 rotates to wind chain 5 on the guide roller 7. This draws piston 2 down against the force of spring 11 so that the volume of pressure chamber 10. is increased. With displacement of pressure relief piston 2 towards its lower dead center position, tappet 9 disengages ball valve 3 to close inlet 95 thereby disconnecting master cylinder 15 from pressure chamber 10 and wheel cylinder 12. With the increase in size of pressure chamber 10, effective braking pressure decreases. The actual value of the change in volume is compared with the set-point value for the pressure reduction, by means of path measurement system 4, and coil 16 is energized accordingly.

As soon as wheel deceleration drops below the second deceleration threshold (10 m/s$^2$), the anti-locking device gives off a signal to reduce the braking force further by exactly the predeterminable amount calculated from the moment of inertia of the rotating wheel so that the braked wheel again accelerates, and thereafter braking pressure is increased again. For this purpose, the set point-value is reduced at comparator 18, whereupon the excitation of coil 16 is reduced, resulting in transfer of a smaller torque to the shaft 6. Pressure relief piston 2 is pushed upward toward its upper dead center position by the force of spring 11, and the braking pressure in wheel cylinder 12 increases. The actual value of the change in volume of chamber 10 is compared with the set point value of the increase in braking pressure and coil 16 is excited accordingly. When the upper speed deceleration threshold (12 m/$^2$) is reached again, a new control cycle starts.

This continuous increase and decrease of braking pressure at wheel cylinder 12 takes place until the vehicle has come to a stop or until the pressure from master cylinder 15 acting on ball seat valve 3 is less than the pressure in the pressure chamber 10.

Figure 2:
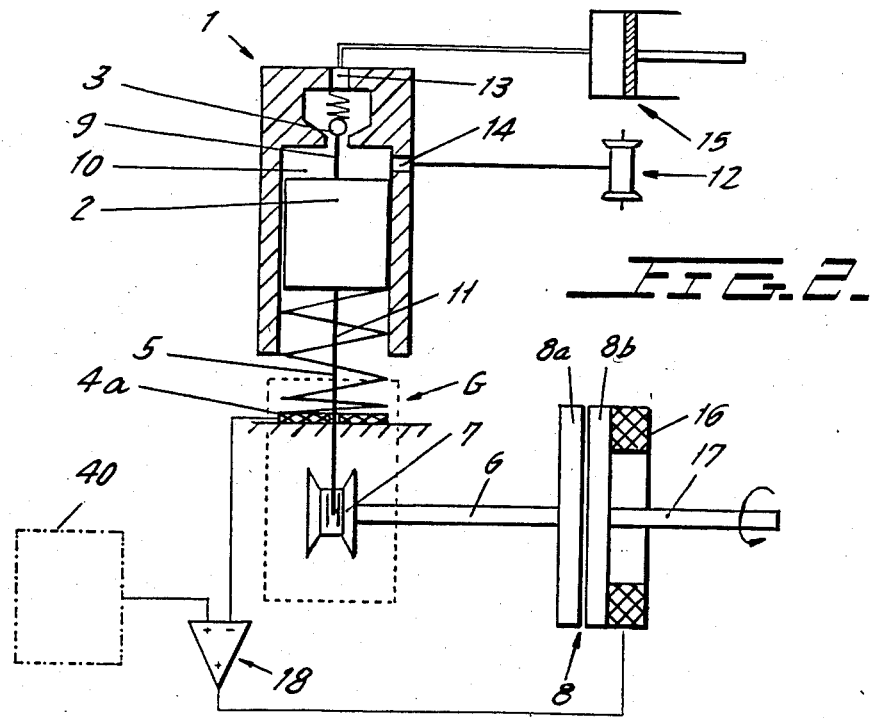
FIG. 2 is a view similar to FIG. 1 illustrating a second embodiment of this invention.

FIG. 2 shows the pressure modulation device with an element for determining the rate of change of the force of compression spring 11. The manner of operation of the pressure modulator 1 is the same as that which has been described above. In FIG. 2, low cost piezoquartz element 4a, which is a passive element not requiring an external source of energy, is arranged behind compression spring 11 and generates voltage signals corresponding to the speed of change of the force acting on it. These voltage signals are fed to set point value/actual value comparator 18 of the closed position control circuit, which in turn energizes excitation coil 16 of the friction clutch 8 in a manner related to the difference between the set-point and the actual values at the inputs of comparator 18.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. Hydraulic braking apparatus for a wheel-supported land vehicle; said apparatus including:

operator actuated first means for generating hydraulic pressure in said apparatus;

hydraulically operated second means for exerting pressure to stop rotation of a wheel means;

third means for communicating hydraulic pressure from said first means to said second means, said third means including an expandable chamber having an inlet for fluid flow between said chamber and said first means;

said second means communicating with said chamber independently of said inlet;

a valve and first biasing means urging said valve in a direction to close said inlet;

a movable section partially defining said chamber, and second biasing means urging said movable section in a first direction to reduce the volume of said chamber and toward operative engagement with said valve to operate same in a direction to open said inlet;

fourth means which when activated operates said movable section in a second direction to increase the volume of said chamber and away from operative engagement with said valve to permit same to close said inlet;

a control means operatively connected to said fourth means to actuate and deactivate same under predetermined conditions of deceleration for a vehicle having wheel means that is to be braked by said apparatus; and said fourth means including an electromagnetic clutch having an output operatively connected to said movable section and a driven rotating input that is coupled to said output when said fourth means is actuated.

2. Hydraulic braking apparatus as set forth in claim 1, in which the clutch is a friction type.

3. Hydraulic braking apparatus as set forth in claim 1, in which there is a wheel connected to the output and a flexible line connecting said movable section to said wheel with the latter rotating upon actuation of said fourth means to roll said flexible line thereon and thereby move said movable section in said second direction.

4. Hydraulic braking apparatus as set forth in claim 3, in which the clutch is a friction type.

5. Hydraulic braking apparatus as set forth in claim 1, in which said second biasing means exerts a force on said movable section that is overcome by pressure in said chamber acting through said movable section when said pressure within said chamber reaches a predetermined level below brake locking level whereby the latter moves said movable section in said second direction permitting said valve to close said inlet and by so doing limiting pressure within said chamber to said predetermined level below brake locking level when pressure exerted by said second means exceeds said predetermined level below brake locking level.

6. Hydraulic braking apparatus as set forth in claim 1, also including a fifth means for generating a signal related to the position of said movable section with said signal being fed to an input of said control means.

7. Hydraulic braking apparatus as set forth in claim 3, in which the fifth means includes a piezoelectric element that generates a signal related to pressure exerted thereon by said second biasing means.

* * * * *